United States Patent [19]

Harada et al.

[11] Patent Number: 4,556,802
[45] Date of Patent: Dec. 3, 1985

[54] UNINTERRUPTIBLE AC POWER SUPPLY

[75] Inventors: Kosuke Harada, Fukuoka; Katsuaki Murata, Kumamoto; Takazi Nakamizo, Fukuoka, all of Japan

[73] Assignee: Nishimu Electronics Industries, Co., Ltd., Fukuoka, Japan

[21] Appl. No.: 583,345

[22] Filed: Feb. 24, 1984

[30] Foreign Application Priority Data

Mar. 24, 1983 [JP] Japan .................................. 58-47902

[51] Int. Cl.$^4$ .............................................. H02J 9/06
[52] U.S. Cl. ......................................... 307/66; 307/87
[58] Field of Search ....................... 307/64, 66, 83, 87, 307/46, 48, 85, 86; 323/267; 336/170

[56] References Cited

U.S. PATENT DOCUMENTS

| | | | |
|---|---|---|---|
| 4,010,381 | 3/1977 | Fickenscher et al. | 307/66 |
| 4,238,691 | 12/1980 | Ebert, Jr. | 307/87 X |
| 4,241,261 | 12/1980 | Ebert, Jr. | 307/64 X |
| 4,475,047 | 10/1984 | Ebert, Jr. | 307/66 |
| 4,510,401 | 4/1985 | Legoult | 307/66 |

OTHER PUBLICATIONS

R. Rando, "Preliminary Report for International Telephone Energy Conference 1978 at Washington".

Primary Examiner—A. D. Pellinen
Assistant Examiner—Derek S. Jennings
Attorney, Agent, or Firm—Kinney & Lange

[57] ABSTRACT

An uninterruptible ac power supply permits parallel operation between a commercial ac line and an inverter unit, greatly simplifies the monitoring of the commercial ac line and minimizes the transient of output voltage during the switching of mode. The uninterruptible ac power supply is comprised of an iron core divided with magnetic shunts into three sections and has an output winding, a winding for a commercial ac line and a winding for an inverter unit, one each wound on the aforementioned three sections of the iron core, the said three windings so disposed that the output winding is wound on one terminal section and the windings for the commercial ac line and the inverter unit are wound on the remaining two sections.

5 Claims, 7 Drawing Figures

UNINTERRUPTIBLE AC POWER SUPPLY

BACKGROUND OF THE INVENTION

1. Field of the Invention

This invention relates to an uninterruptible ac power supply, and more particularly to an uninterruptible ac power supply which, in case of a failure in a commercial ac line or a heavy drop in voltage of the power supplied in the commercial ac line, converts the energy of a battery by a power inverter into ac power and feeds the ac power to a load without any transient or an interruption.

2. Description of the Prior Art

Most, if not all, of the recent devices for communication and data processing do not tolerate even momentary power failure and call for power supplies of extremely high reliability. In this respect, uninterruptible ac power supplies have found widespread acceptance.

FIG. 1, FIG. 2, and FIG. 3 are block diagrams schematically illustrating configurations of conventional uninterruptible ac power supplies. In these diagrams, like symbols denote like or equivalent parts.

In the uninterruptible ac power supply of FIG. 1, a battery charger 2 rectifies the commercial ac and charges a battery 4 while a commercial ac line 1 is normally operating. At the same time, the aforementioned commercial ac line 1 actuates an inverter 3 through the medium of a control unit 10.

The ac power which has been converted to stated voltage and frequency is fed through a switch 6 to a load 7. In this while, a switch 5 is kept open.

When the inverter 3 goes out of order, the switch 6 is opened and the switch 5 is closed. Consequently, the ac power is fed directly from the commercial ac line 1 to the load 7.

When the commercial ac line 1 encounters a failure, the charging of the battery 4 by the battery charger 2 ceases to exist. Since the operation of the inverter 3 is continued by virtue of the energy stored in the battery 4, however, the supply of the ac power to the load 7 proceeds without any transient.

This uninterruptible ac power supply nevertheless suffers from the following drawbacks.

(1) Since the dual power transformations of conversion and inversion are effected by the operation of the charger 2 and the inverter 3 for the purpose of ensuring continuous supply of power to the load 7 even while the commercial ac line is operating normally, the apparatus has very poor efficiency.

(2) Since the power is supplied to the inverter 3 while the battery is kept charged, the apparatus inevitably necessitates use of a battery charger 2 of a large capacity.

(3) The reliability of the power supply is impaired because the battery charger 2 and the inverter 3 are serially connected relative to the load 7. When either of these components encounters a trouble, the load 7 is supplied the power directly by the commercial ac line 1 which is not always guaranteed to provide constant voltage while the component in trouble is being repaired or replaced with a standby.

(4) Any effort to overcome the drawback indicated in the above item (3) and warrant high reliability of the power supply necessitate redundant design such as standby sets of a battery charger and an inverter installed for parallel operation to the regular set.

FIG. 2 represents a configuration of the uninterruptible ac power supply which additionally incorporates a three-winding transformer 9 adapted to ensure stable power supply to the load by the composition of the powers from the commercial ac line and the inverter.

The three-winding transformer 9 has a core 9F divided into three sections with two magnetic shunts 9S and has a third winding 9C (the output winding connected to the load 7) formed on the central section and a first winding 9A (the input winding for the commercial ac line) and a second winding 9B (the winding for the inverter) formed respectively on the opposite terminal sections.

In FIG. 2, while the commercial ac line 1 is operating normally, the power from this line is transferred through the path of the switch 5→the first winding 9A of the three-winding transformer 9→the third winding 9C of the same transformer 9→the voltage stabilizing circuit 8 to the load 7.

In contrast, the power from the inverter 3 is transferred through the path of the battery charger 2→the battery 4→the inverter 3→the switch 6→the second winding 9B of the three-winding transformer 9→the third winding 9C of the same transformer→the voltage stabilizing circuit 8 to the load 7.

In this case, the flow of power from the inverter 3 to the load is nulled and the inverter is set to its standby status by controlling the output phase of the inverter 3 to keep an in-phase relation with the voltage phase in the load 7.

When the commercial ac line 1 encounters a power failure, the power stored in the battery 4 is immediately transformed to an ac power in the aforementioned path going through the inverter 3 and supplied in the form of ac to the load.

This configuration materializes a highly efficient, highly reliable and economical uninterruptible ac power supply free from the drawbacks of the apparatus of FIG. 1 described above.

Even in this apparatus, a review of its operation in terms of the power flow and the phase control within the three-winding transformer 9 reveals that at the instant of a power failure in the commercial ac line, there inevitably occurs a transient of some degree in the output voltage. As a measure to cope with this phenomenon, therefore, the commercial ac line must be given quite rigid voltage monitoring and the inverter must be given rapid phase control.

FIG. 3 is a block diagram illustrating another conventional configuration using a three-winding transformer.

In the apparatus of FIG. 3, while the commercial ac line is operating normally, the power therefrom is transferred through the path of the switch 5→the first winding 9A of the input transformer 9→the third winding 9C of the same transformer→the voltage stabilizing circuit 8 to the load 7.

In the meantime, part of the power from the commercial ac line is separated at the first winding 9A of the input transformer 9 and transferred through the path of the second winding 9B→a reversible power converter 12 (in the mode of conversion)→the battery 4, there to charge the battery 4.

A control unit 10 is possessed of a switch function for enabling the reversible power converter 12 to be operated in the conversion mode when the commercial ac line 1 is in its normal status and in the inversion mode when the commercial ac line is interrupted. It further possesses functions to effect automatic synchronization, voltage control and switching.

Owing to the function to effect automatic synchronization, the control unit 10 keeps the frequency of an oscillator (not shown) synchronized with that of the commercial ac line while the commercial ac line is normally operating and, upon detection of an interruption in the commercial ac line, immediately opens the switch 5 and issues a drive signal to the reversible power converter 12 to operate it on the inversion mode and supply the power through the second and third windings 9B, 9C of the transformer, the iron core 9F, and the voltage stabilizing circuit 8 to the load 7.

When the commercial ac line 1 resumes its normal status and the phase of the commercial ac line 1 and that of the output voltage of the reversible power converter 12 being operated in the inversion mode are synchronized, the aforementioned control unit 10 stops the driving of the aforementioned reversible power converter 12 and, at the same time, closes the switch 5 to change the source for the power of the load 7 to the commercial ac line 1 from the battery 4.

At the same time, the control unit 10, by its switching function, further causes the reversible power converter 12 to operate in the conversion mode and control the output voltage thereof to charge the battery 4.

As is evident from the foregoing desdription, in the apparatus of FIG. 3, the energy of the battery 4 is immediately transferred through the path of the reversible power converter 12 (in the inversion mode)—the second winding 9B of the transformer 9—the third winding 9C of the transformer—the voltage stabilizing circuit 8 to the load 7 on occurrence of a power failure in the commercial ac line 1.

This apparatus has a salient characteristic that since a converter circuit and an inverter circuit are combined integrally as the reversible power converter 12 and share the use of the second winding 9B of the transformer 9, no use is found for an independent battery charger. In spite of this feature, the apparatus suffers from the following drawbacks.

(1) The commercial ac line 1 must be kept under constant watch against occurrence and termination of power failure. On detection of such occurrence or termination of the power failure, the reversible power converter 12 must be switched by proper switch means to the inversion mode or to the conversion mode.

(2) Since the first winding 9A and the second winding 9B of the transformer 9 are tightly coupled by the same section of iron core 9F, no parallel operation can be effected between the commercial ac line 1 and the reversible power converter 12 in the inversion mode. As the result, the control circuit for permitting high-speed switching of mode becomes complicated and the occurrence of transient phenomenon of output voltage during this switching can not be substantially precluded.

SUMMARY OF THE INVENTION

This invention has been perfected with a view to eliminating the various drawbacks suffered by the conventional apparatuses as described above. An object of this invention is to provide an uninterruptible ac power supply which permits parallel operation between a commercial ac line and an inverter unit, greatly simplifies the monitoring of the commercial ac line, and minimizes the transient of output voltage during the switching of mode.

To accomplish the object described above, the present invention provides an uninterruptible ac power supply which has an iron core divided with magnetic shunts into three sections and has an output winding, a winding for a commercial ac line, and a winding for an inverter unit one each wound on the aforementioned three sections of the iron core. And, the uninterruptible ac power supply of this invention is characterized by having the said three windings so disposed that the output winding is wound on one terminal section and the windings for the commercial ac line and the inverter unit are wound on the remaining two sections.

DETAILED DESCRIPTION OF THE PREFERRED EMBODIMENTS

Now, the present invention will be described in detail below with reference to the accompanying drawings.

Figure 4:
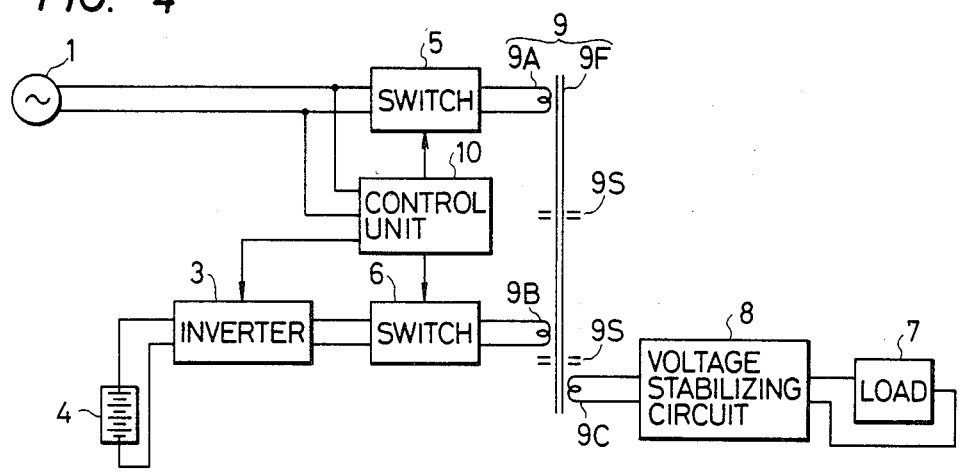
FIG. 4 is a block diagram of one embodiment of the present invention.

FIG. 4 is a block diagram illustrating the configuration of one embodiment of the present invention. In this diagram, the same symbols as those used in FIG. 2 denote the same or equivalent parts.

The three-winding transformer 9 possesses two magnetic shunts 9S at separate positions and has a first winding 9A (for a commercial ac line), a second winding 9B (for an inverter unit), and a third winding 9C (for output) disposed in the three sections which are divided by the two magnetic shunts. Comparison of the arrangement of the individual windings in this three-winding transformer 9 with that in the three-winding transformer of the conventional apparatus of FIG. 2 clearly reveals that the relative positions of the second winding 9B and the third winding 9C in the configuration of the present embodiment is reversed from those in the conventional apparatus.

In the embodiment of FIG. 4, while the commercial ac line is normally operating, the power from the commercial ac line 1 is transferred through the path of the switch 5→the first winding 9A of the three-winding transformer 9→the third winding 9C of the same transformer→the voltage stabilizing circuit 8 to the load 7.

In contrast, the power from the inverter unit 3 is transferred through the path of the battery 4→the inverter unit 3→the switch 6→the second winding 9B of the three-winding transformer 9→the third winding 9C of the same transformer→the voltage stabilizing circuit 8 to the load 7.

Figure 5:
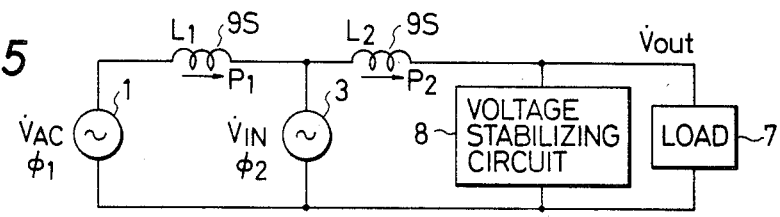
FIG. 5 is an equivalent circuit of the diagram of FIG. 4.

FIG. 5 is an equivalent circuit diagram for illustrating the relation between the flow of power and the phase of voltage in the three-winding transformer of FIG. 4. In this diagram, $L_1$ and $L_2$ denote leakage inductance components which are able to be made of the magnetic shunts 9S. Here, it is assumed that the voltage $V_{AC}$ of the commercial ac line 1 and the output voltage $V_{IN}$ of the inverter unit have one and the same frequency and have phase differences $\phi_1$, $\phi_2$ relative to the phase of the voltage applied to the load 7, namely the output voltage $V_{out}$ of the voltage stabilizing circuit 8.

On the foregoing assumption, the power $P_1$ supplied from the commercial ac line 1 via the inductance $L_1$ to the inverter unit 3 and the power $P_2$ supplied from the inverter unit 3 via the inductance $L_2$ to the voltage stabilizing circuit 8 and the load 7 are expressed by the following formulas (1), (2).

$$P_1 = \frac{V_{AC} \cdot V_{IN}}{\omega L_1} \sin(\phi_1 - \phi_2) \qquad (1)$$

$$P_2 = \frac{V_{IN} \cdot V_{out}}{\omega L_2} \sin\phi_2 \qquad (2)$$

Thus, the incoming power and the outgoing power of the inverter unit 3 are offset to zero by adjusting the phase $(\phi_1 - \phi_2)$ between the voltages $V_{AC}$ and $V_{IN}$ so as to satisfy the expression $P_1 = P_2$ (actually by making adjustment to delay the voltage $V_{IN}$ by a predetermined angle). As the result, the inverter unit 3 is set to the status of standby operation.

When the commercial ac line 1 encounters a power failure while the inverter unit 3 is in the status just mentioned, the $P_1$ of the aforementioned formula (1) is reduced to zero but the relation of the formula (2) remains intact. Thus, no transient occurs in the output circuit because the output power $P_2$ to the load 7 continues to be supplied from the inverter unit 3.

When the phase of the output voltage $V_{IN}$ of the inverter unit 3 is delayed behind that of the commercial ac line $V_{AC}$ so much that $P_1$ becomes greater than $P_2$, the power flows in the reverse direction (in the direction of inflow) to the inverter unit 3 to charge the battery charger 4 with the power of $(P_1 - P_2)$ (in the floating condition).

Here, the voltage stabilizing circuit 8 stabilizes the output voltage without being affected at all by any slight variation in the voltage of the power supplied from the commercial ac line 1 or from the inverter unit 3, exhibits a drooping characteristic to the excess current, fulfils the function of a filter, eliminates higher harmonics and supplies stable voltage to the load.

The control unit 10 possesses the function of automatic synchronization, the function of phase adjustment, the functions of monitoring the various parts of the power supply and controlling the switches, the functions of driving and controlling the inverter unit, and the function of issuing alarms; all these functions necessary for monitoring and controlling the states and operations of the various circuits of the uninterruptible ac power supply.

The aforementioned function of automatic synchronization enables the commercial ac line 1 and the inverter unit 3 to be parallelly operated through the three-winding transformer 9 by synchronizing the inverter unit 3 with the commercial ac line 1. The function of phase adjustment enables the inverter unit 3 to be operated in its standby status or in the capacity of a battery charger by adjusting the phase difference between the voltage $V_{AC}$ of the commercial ac line and the output voltage $V_{IN}$ of the inverter unit 3.

Figure 3:
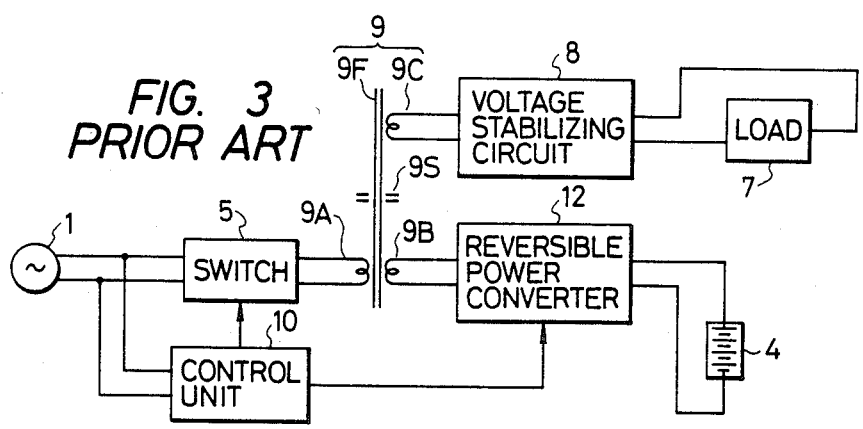

As is evident from the foregoing description, the present embodiment enjoys a notable effect that it finds absolutely no use for those circuits which are required in the conventional apparatus of FIG. 3 such as for switching the reversible power converter with proper switch means upon occurrence or termination of a power failure in the commercial ac line and enables the change of mode between the charging (or conversion) and the inversion to be effected automatically and continuously solely through phase control.

Figure 6:
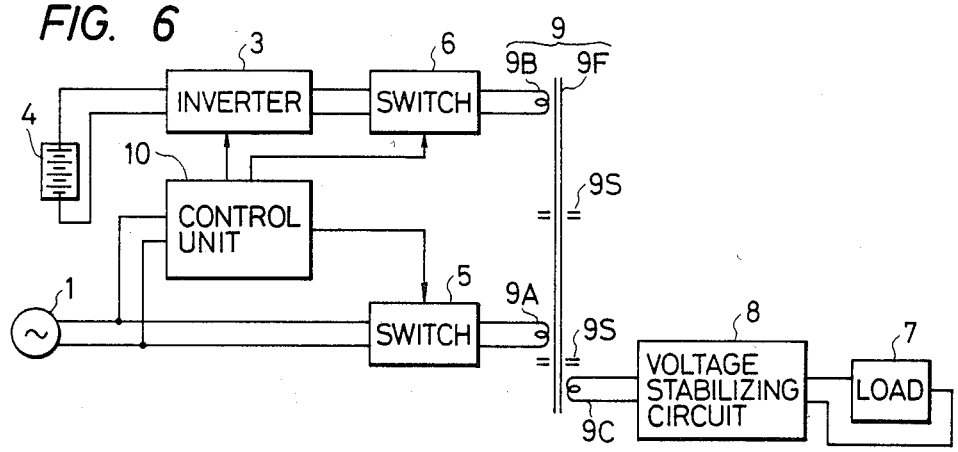
FIG. 6 is a block diagram of another embodiment of this invention.
Figure 7:
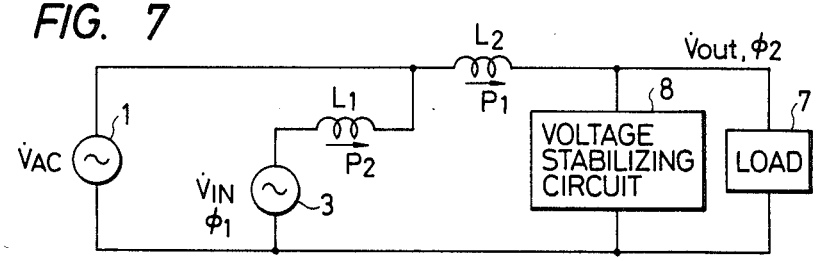
FIG. 7 is an equivalent circuit of the diagram of FIG. 6.

FIG. 6 is a block diagram illustrating another embodiment of this invention and FIG. 7 is an equivalent circuit diagram thereof. In these diagrams, the same symbols as those used in FIG. 4 and FIG. 5 denote the same or equivalent parts.

As is clearly noted from FIG. 6 as compared with FIG. 4, the present embodimetn equals the first embodiment described above, except that the relative positions of the first winding 9A and the second winding 9B are reversed.

In the present embodiment, while the commercial ac line 1 is normally operating, the power from the commercial ac line 1 is transferred through the path of the switch 5→the first winding 9A of the three-winding transformer 9→the third winding 9C of the same transformer→the voltage stabilizing circuit 8 to the load 7.

In contrast, the power from the inverter unit 3 is transferred through the path of the battery 4→the inverter unit 3→the switch 6→the second winding 9B of the three-winding transformer 9→the third winding 9C of the same transformer→the voltage stabilizing circuit 8 to the load 7.

In the equivalent circuit of FIG. 7, let $\phi_1$ and $\phi_2$ stand for the phase of the output voltage $V_{IN}$ of the inverter unit 3 and that of the voltage $V_{out}$ of the voltage stabilizing circuit 8 respectively relative to the voltage $V_{AC}$ of the commercial ac line 1, and the power $P_1$ supplied from the commercial ac line 1 to the voltage stabilizing circuit 8 and the load 7 and the power $P_2$ supplied from the inverter unit 3 to the commercial ac line 1 will be expressed by the following formulas (3), (4).

$$P_1 = \frac{V_{AC} \cdot V_{out}}{\omega L_2} \sin\phi_2 \qquad (3)$$

$$P_2 = \frac{V_{IN} \cdot V_{IN}}{\omega L_1} \sin\phi_1 \qquad (4)$$

While the commercial ac line 1 is normally operating, the present apparatus is so operated as to null the power flowing from the inverter unit 3 to the commercial ac line 1 by reducing the phase $\phi_1$ to 0, namely by establishing the in-phase relation between the voltage $V_{IN}$ of the inverter unit 3 and the voltage $V_{AC}$ of the commercial ac line 1. Evidently, in the resultant condition of the apparatus, the inverter unit 3 is kept in the status of standby operation.

Now, on the assumption that the commercial ac line 1 encounters an interruption and the inverter unit 3 continues to operate in the phase relation so far existed, the power $P_{2a}$ to be supplied from the inverter unit 3 to the voltage stabilizing circuit 8 and the load 7 is expressed by the following formula (5).

$$P_{2a} = \frac{V_{IN} \cdot V_{out}}{\omega (L_1 + L_2)} \sin\phi_2 \qquad (5)$$

On the assumption of the equations $L_1 = L_2 = L$ and $V_{AC} = V_{IN}$ (which are normal design conditions), the aforementioned formula (5) may be developed as follows.

$$P_{2a} = \frac{V_{AC} \cdot V_{out}}{2 \omega L_1} \sin\phi_2 = \frac{P_1}{2}$$

This equation implies that the power supplied to the load 7 is decreased to one half of the level exisiting while the commercial ac line is normally operating. As the result, although the output voltage $V_{out}$ is lowered, it is brought back to the normal level after several cycles of transient response by the operation of the magnetic resonance circuit embraced in the voltage stabilizing circuit 8.

Figure 1:
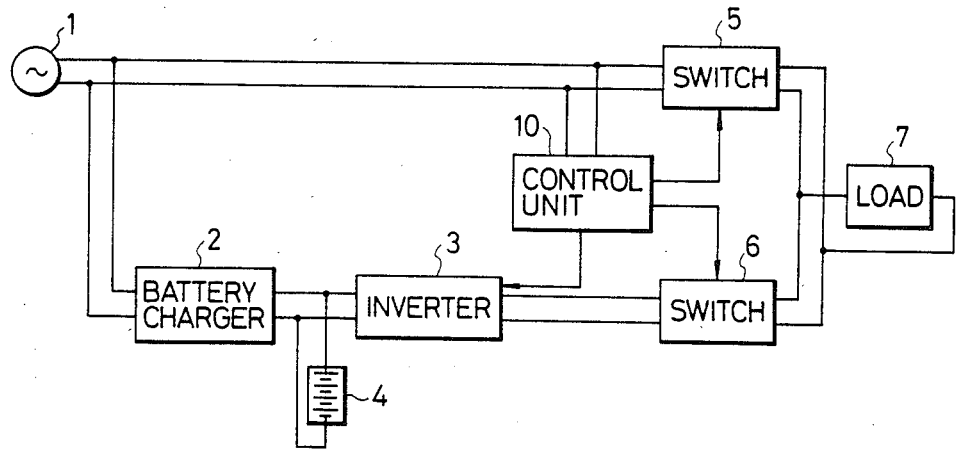
FIG. 1, FIG. 2, and FIG. 3 are block diagrams illustrating configurations of conventional uninterruptible ac power supplies.
Figure 2:
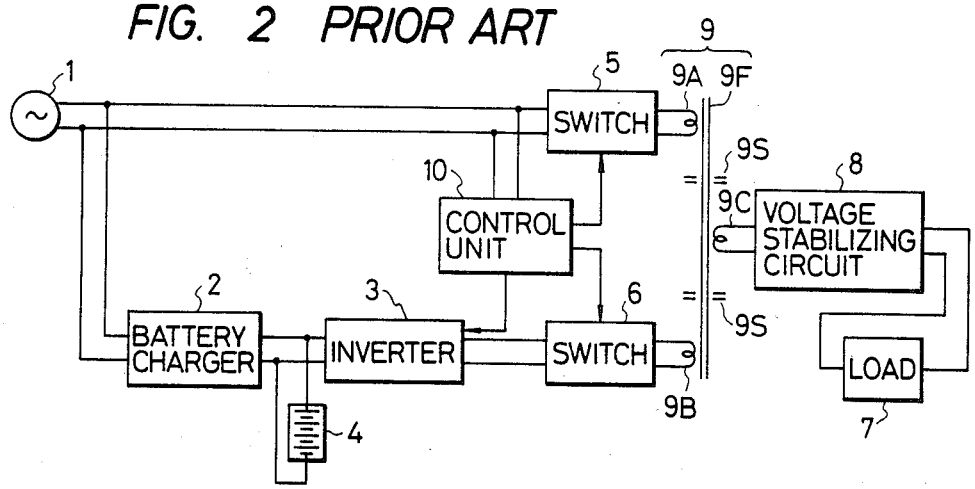

In the present embodiment, although the transient of output voltage which occurs when the commercial ac line 1 encounters an interruption is greater than that involved in the embodiment of FIG. 4, it is small as compared with the transient involved in the conventional uninterruptible ac power supply illustrated in FIG. 2.

In the aforementioned embodiments, it should be recognized that the switch 5 inserted between the inverter unit 3 and the transformer winding 9B is not a necessity, and it can be eliminated.

As is clear from the foregoing description, the present invention accomplishes the following effects:

(1) Parallel operation is enabled between the commercial ac line and the inverter unit to warrant notable simplification of the constant monitoring of the commercial ac line.

(2) The fall and transient of the output voltage during the change of mode can be kept down to the minimal degrees.

(3) Since no use is found for control of the switch between a converter and an inverter, the control circuitry can be simplified and the reliability improved and the cost lowered.

(4) Since the inverter unit, in the status of standby operation or in a similar status, charges the battery in floating condition while the commercial ac line is normally operating, there is no need for separately installing special charging means for the battery.

What is claimed is:

1. An uninterruptible ac power supply, comprising in combination an iron core divided by magnetic shunts into first and second terminal side sections and a center section therebetween, a three-winding transformer incorporating one output winding formed on the first terminal side section and two input windings formed one each on the remaining two sections, an inverter unit connected to one of said two input windings, a commercial ac line connected via switch means to the other of said two input windings, a battery connected to said inverter unit and adapted to supply power thereto, and means for controlling to a predetermined value the phase difference between the output voltage of said inverter unit and the voltage of said commercial ac line.

2. An uninterruptible ac power supply according to claim 1, wherein said phase difference is fixed so that the power transferred from said inverter unit to said output winding is substantially nulled while said commercial ac line is normally operating.

3. An uninterruptible ac power supply according to claim 1, wherein said phase difference is fixed so that said inverter unit effects floating charge of said battery while said commercial ac line is normally operating.

4. An uninterruptible ac power supply according to claim 1, claim 2, or claim 3, wherein said input winding connected to said inverter unit is formed on the center section of said iron core adjoining the first terminal side section of said iron core having said output winding formed thereon and said input winding connected to said commercial ac line is formed on the second terminal side section of said iron core farther from the first terminal side section of said iron core having said output winding formed thereon.

5. An uninterruptible ac power supply according to claim 1, claim 2, or claim 3, wherein said input winding connected to said commercial ac line is formed on the center section of said iron core adjoining the first terminal side section of said iron core having said output winding formed thereon and said input winding connected to said inverter unit is formed on the second terminal side section of said iron core farther from the first terminal side section of said iron core having said output winding formed thereon.

* * * * *